United States Patent

Sonoda et al.

[11] Patent Number: 6,046,566
[45] Date of Patent: Apr. 4, 2000

[54] METHOD OF AND APPARATUS FOR CONTROLLING A PLURALITY OF SERVOMOTORS

[75] Inventors: Naoto Sonoda; Yukio Toyosawa; Kazuomi Maeda, all of Kumamoto, Japan

[73] Assignee: Fanuc Ltd., Yamanashi, Japan

[21] Appl. No.: 09/295,105

[22] Filed: Apr. 21, 1999

[30] Foreign Application Priority Data

Apr. 21, 1998 [JP] Japan ................................. 10-125369

[51] Int. Cl.⁷ .................................................. G05B 11/32
[52] U.S. Cl. ...................................... 318/625; 318/568.22
[58] Field of Search .................................. 318/52, 66–69, 318/77, 81, 85, 568.22, 625, 5, 8, 98, 99

[56] References Cited

U.S. PATENT DOCUMENTS

| | | | |
|---|---|---|---|
| 4,485,338 | 11/1984 | Matsuura et al. | 318/569 |
| 5,025,200 | 6/1991 | Kurakake et al. | 318/569 |
| 5,646,495 | 7/1997 | Toyozawa et al. | 318/625 |
| 5,691,616 | 11/1997 | Iwashita | 318/615 |

*Primary Examiner*—Robert E. Nappi
*Assistant Examiner*—Rina I. Duda
*Attorney, Agent, or Firm*—Staas & Halsey LLP

[57] ABSTRACT

A method of and an apparatus for controlling a plurality of servomotors, in which one driven body is driven by one main servomotor and at least one subordinate servomotor. Synchronous control is performed with good response and high accuracy and repetitive control is performed with simple arrangement preventing interference between axes, and further operation mode of the plurality of servomotors is easily switched between coupled driving and independent driving. A plurality of servomotors comprises one main servomotor and at least one other servomotor subordinate to the main servomotor, and position control is performed on the main servomotor side while velocity control and current control are performed individually for each servomotor. A velocity command for the main servomotor is subjected to a position adjustment based on a position deviation between the main servomotor and subordinate servomotor and the adjusted velocity command is used for the subordinate servomotor. Thus, the response is improved and synchronous control is performed with high accuracy.

8 Claims, 10 Drawing Sheets

METHOD OF AND APPARATUS FOR CONTROLLING A PLURALITY OF SERVOMOTORS

BACKGROUND OF THE INVENTION

1. Field of the Invention

The present invention relates to a method of and an apparatus for controlling AC servomotors for use as a driving source of an industrial machine such as a machine tool controlled by a numerical control (NC) device, and a robot.

2. Description of the Related Art

In the case where a large-sized workpiece is driven by a single servomotor as with a C-axis of a crankshaft grinding machine, the workpiece is occasionally twisted to cause torsion due to machining disturbance, and such torsion of the workpiece adversely affects a machining accuracy.

Conventionally, to cope with the torsion of a workpiece, two servomotors are arranged at opposite sides of the workpiece and are driven in synchronism with each other, to reduce the torsion of the workpiece.

Figure 11:
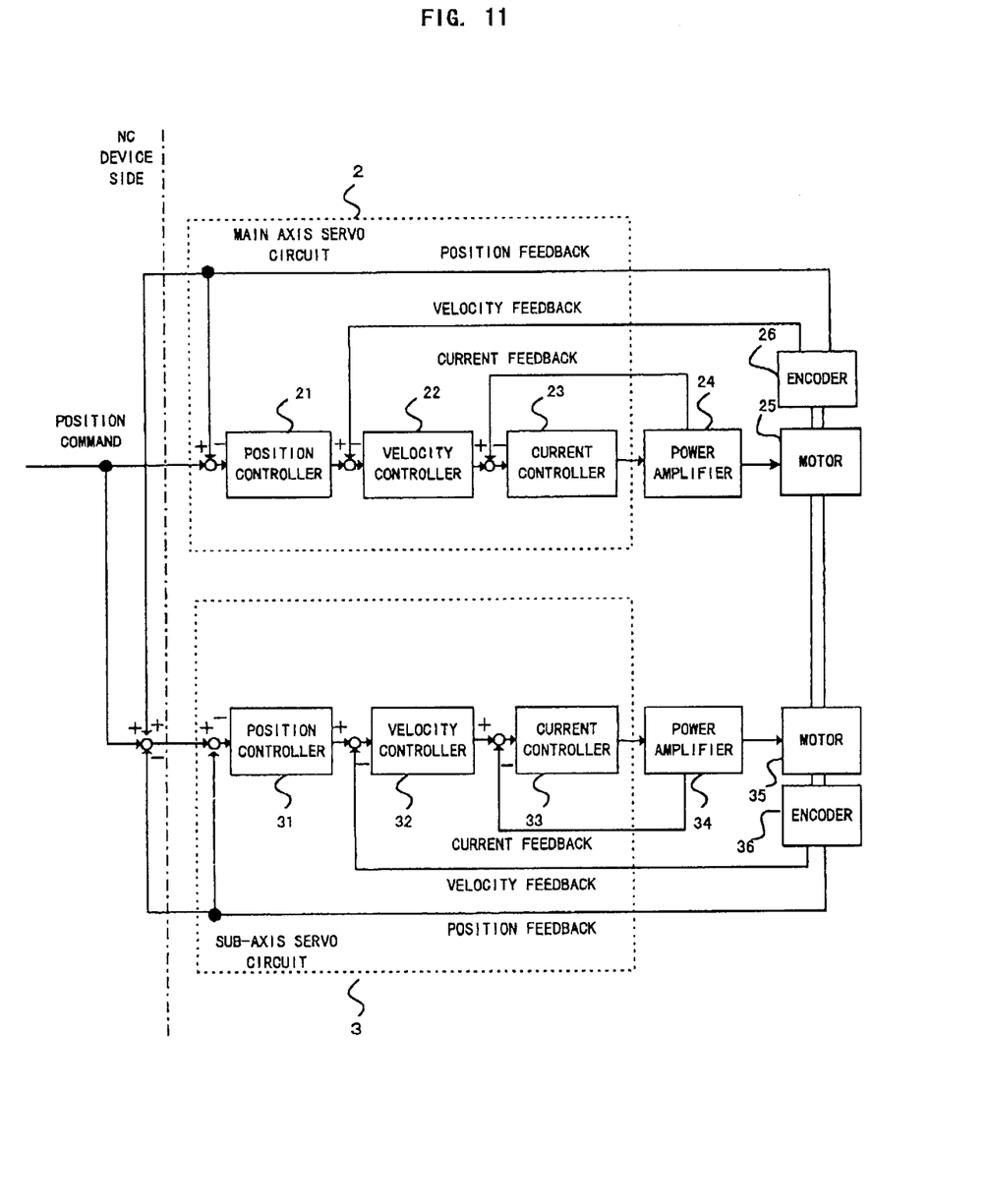
FIG. 11 is a schematic block diagram illustrating conventional synchronous control for two servomotors.

As a conventional driving technique, synchronous control is known in which one driving system is controlled by two servomotors coupled to each other. FIG. 11 is a schematic block diagram illustrating conventional synchronous control for two servomotors. In FIG. 11, a main axis and a sub-axis coupled to an unshown workpiece are associated with a main servomotor 25 and a sub-servomotor 35, respectively, the main servomotor 25 being controlled by a main servo circuit 2 while the sub-servomotor 35 being controlled by a sub-servo circuit 3. The servo circuit 2, 3 comprises a position controller 21, 31, a velocity controller 22, 32 and a current controller 23, 33 respectively, and is supplied with an identical position command from a numerical controller.

In the control shown in FIG. 11, to adjust a synchronization error between the main servomotor 25 and the sub-servomotor 35, position feedback values are obtained from encoders 26 and 36 associated with the servomotors 25 and 35, respectively, an adjusting value is derived using the position feedback values, and the adjusting value is added to the position command for the sub-servo circuit 3.

In some cases, high-accuracy control is required for driving servomotors. As such high-accuracy control for controlling servomotors which, for example, perform operation repeated at a predetermined period as in the case of driving the C axis of a crankshaft grinding machine, repetitive control for correcting a predetermined periodic component, which is a sort of learning control, is known.

Figure 12:
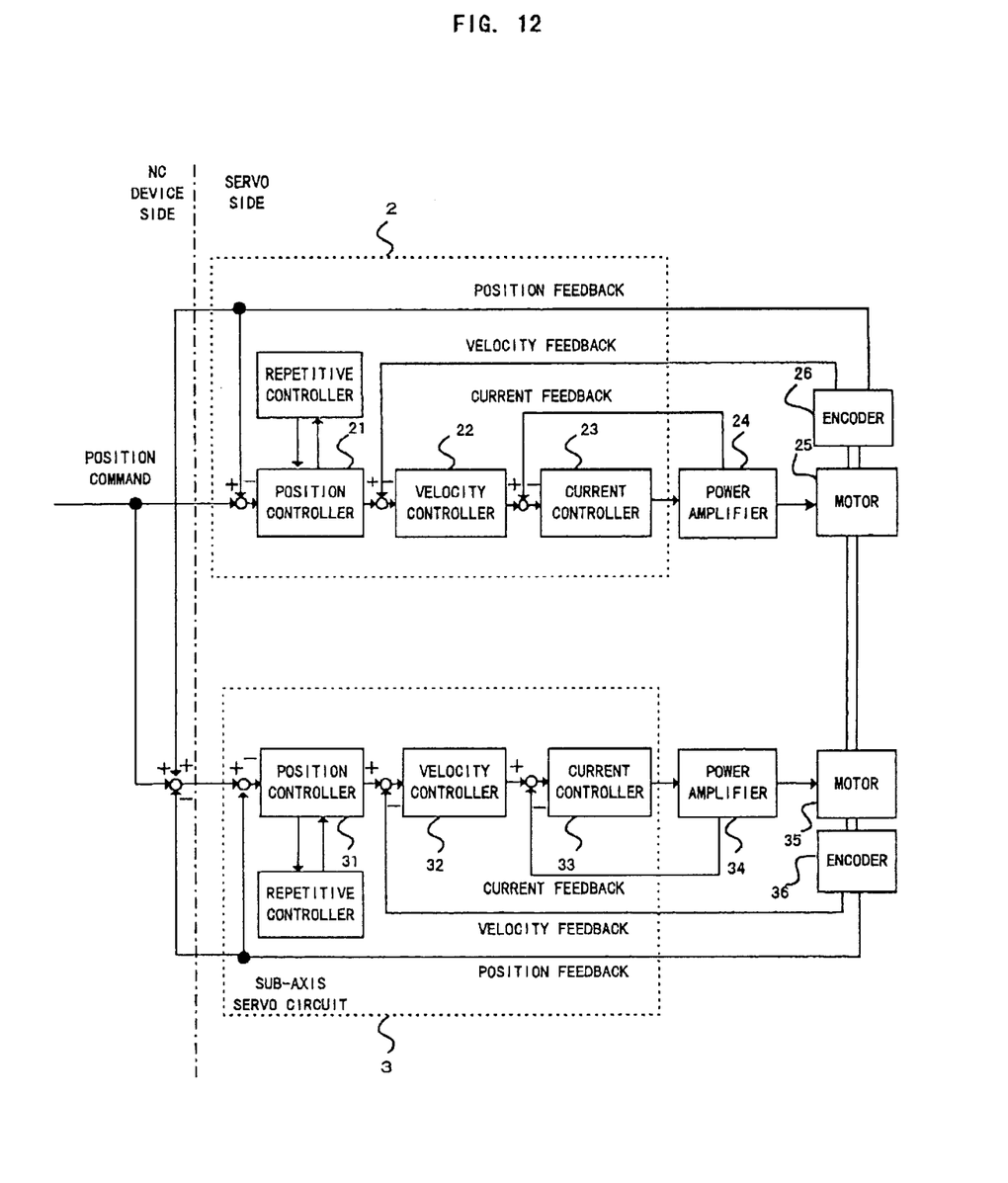
FIG. 12 is an example of arrangement wherein repetitive control is applied to a conventional servo circuit.

FIG. 12 illustrates a configuration in which repetitive control is applied to servo circuits, wherein repetitive controllers 27 and 37 are provided in the main servo circuit 2 and the sub-servo circuit 3, respectively, to perform repetitive control for each of the servomotors. Each repetitive controller is input with a position deviation between a position command and a position feedback value and returns its output to the position deviation, to correct the periodic component of the position deviation.

Conventionally, in the case of controlling one driving system by a plurality of servomotors including one main motor (main servomotor) and at least one sub-motor (subordinate servomotor), the position command is adjusted at the numerical control device side for a plurality of servo circuits for controlling the respective servomotors, as shown in FIG. 11, to thereby prevent synchronization error between the main motor and the sub-motor. With the conventional control method, however, since the position command is adjusted at the numerical control device side, the response is poor and it is difficult to perform synchronous control with high accuracy.

In the case of the repetitive control, a repetitive controller is additionally provided for each of the position controllers associated with the main axis and the sub-axis, respectively. Consequently, a lag-module memory, which is an element constituting the repetitive controller, is increased in size, exerting an influence upon the hardware mounting area or the cost, and if the mounting area or the cost is reduced, then the control accuracy lowers. Also, if the same processor is used for the processing of both the main axis and the sub-axis, the processing time increases, imposing restrictions on hardware or cost because of the need for a high-speed processor.

Further, since the position control of the servomotors is performed using a plurality of repetitive controllers, interference between axes occurs in high-rigidity machines, giving rise to a problem that convergence of the position deviation of a workpiece lowers.

Also, in the case where the control is applied to the C axis of a crankshaft grinding machine, the motor coupling is often released to allow attachment and detachment of a workpiece, and in such cases the main motor and the sub-motor need to be operated independently. With the conventional control method, it is difficult to perform switchover between coupled drive mode and independent drive mode.

SUMMARY OF THE INVENTION

A first object of the present invention is to provide high-response, high-accuracy synchronous control. A second object of the present invention is to facilitate switchover between coupled driving and independent driving of a plurality of servomotors, and a third object is to perform repetitive control with simple arrangement while preventing interference between axes.

In the servomotor controlling method according to the present invention, one driven body is driven by one main servomotor and at least one sub-servomotor subordinate to the main servomotor, position control is performed by a main servo system while velocity control is individually performed by sub-servo system, and a velocity command for the main servomotor is adjusted based on a position deviation between the main servomotor and the sub-servomotor and is used as a velocity command for the sub-servomotor. The adjustment of the position command is performed within the servo system to improve response, and the velocity control for the sub-servomotor is carried out using the velocity command obtained by the position adjustment, so that the synchronous control can be performed with high accuracy.

Further, repetitive control is performed with respect only to the position control of the main servomotor, whereby the arrangement is simplified and interference between axes is prevented.

According to an aspect of the present invention, the servomotor controlling method comprises the steps of: performing position control processing for a main servomotor to output a common velocity command for the main servomotor and for at least one sub-servomotor; performing velocity control processing for the main servomotor based on the common velocity command; obtaining a position adjusting value for the sub-servomotor by multiplying a difference between a position feedback value of the main servomotor and a position feedback value of the sub-servomotor by a gain having the same value as that of a position gain used in the position control processing for the main servomotor, and adjusting the common velocity command using the position adjusting value; performing velocity control processing for the sub-servomotor based on the adjusted velocity command.

With this method, the position control is performed on the servo circuit side in the main servo circuit among the circuits for a plurality of servomotors, whereby the response can be improved. The position control for the subordinate servomotor is not performed in the subordinate servo circuit, but performed using the common velocity command obtained by the position control of the main servo circuit. The velocity command obtained at the main servo circuit side is subjected to position adjustment based on a position deviation between the main and subordinate servomotor sides, and using the thus-adjusted velocity command, the velocity control of the subordinate servomotor is performed, thereby permitting synchronous control.

According to another aspect of the present invention, the servomotor controlling method comprises the steps of. switching into one of a synchronized operation mode in which a main servomotor and at least one sub-servomotor operate in synchronism with each other and an independent operation mode in which the main servomotor and the sub-servomotor operate independently of each other; performing position control processing for the main servomotor to output a velocity command; performing velocity control processing for the main servomotor based on the velocity command; in the synchronized operation mode, obtaining a position adjusting value for the sub-servomotor by multiplying a difference between a position feedback value of the main servomotor and a position feedback value of the sub-servomotor by a gain having the same value as that of a position gain used in the position control processing for the main servomotor, and adjusting the velocity command using the position adjusting value, and in the independent operation mode, obtaining a velocity command for the sub-servomotor by multiplying a difference between a position command and the position feedback value of the sub-servomotor by the gain having the same value as that of the position gain used in the position control processing for the main servomotor; in the synchronizing operation mode, performing velocity control processing for the sub-servomotor based on the adjusted velocity command, and in the independent operation mode, performing velocity control processing for the sub-servomotor based on the velocity command for the sub-servomotor.

The synchronous operation mode and the independent operation mode are switched over by simultaneously performing switching between the feedback value of the sub-servomotor and the position command, and on/off switching of input of the velocity command from the main servo system.

With this method, the synchronous control and the independent control of the main servomotor and the sub-servomotor can be switched simply by means of switchover of signals to be inputted for the position adjustment. Further, when the control mode is switched to the synchronous operation mode, a difference between the position feedback value of the main servomotor and the position feedback value of the sub-servomotor is multiplied by a gain equal to that of the position control, and this position adjustment provides a velocity command similar to that obtained by the position control in the sub-servomotor, so that position synchroneity can be maintained.

In the position control processing, a position deviation between the position command and the position feedback value may be subjected to periodic component correction and the position control is performed using the corrected position deviation. Correction of the periodic component can be achieved by repetitive control in which the difference between the position command and the position feedback value is integrated at every sampling period.

Further, the present invention provides an apparatus for performing the above-described control method of the servomotors.

DETAILED DESCRIPTION OF THE PREFERRED EMBODIMENTS

Figure 1:
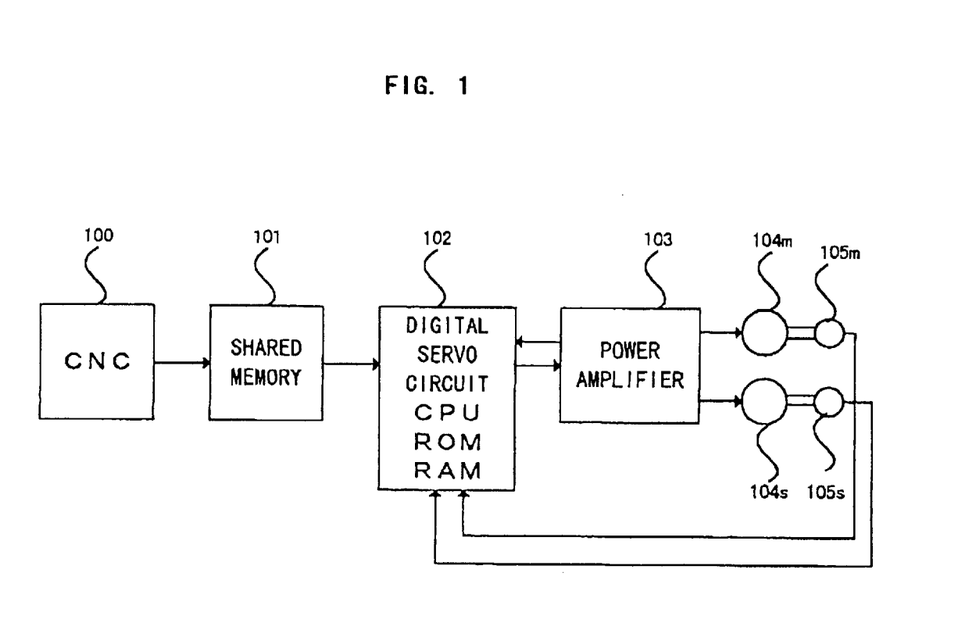
FIG. 1 is a block diagram of a servomotor control system to which the present invention is applicable.

FIG. 1 is a block diagram of a servomotor control system to which the present invention is applicable, and shows an arrangement wherein two servomotors as a plurality of servomotors, that is, a main servomotor and a sub-servomotor, are coupled. A device for performing digital servo control is identical in configuration with that conventionally known in the art and thus is illustrated only schematically.

In FIG. 1, reference numeral 100 denotes a computerized numerical control (CNC) device, 101 denotes a shared RAM, 102 denotes a digital servo circuit including a processor (CPU), ROM, RAM, etc., 103 denotes a power amplifier such as a transistor inverter, 104m denotes a main servomotor, 104s denotes a sub-servomotor, and 105m and 105s denote encoders for generating pulses with rotation of the main servomotor 104m and the sub-servomotor 104s, respectively, and detecting respective rotor phases. The main servomotor 104m and the sub-servomotor 104s are coupled to a workpiece, not shown, and constitute a single driving system.

The processor 102 of the digital servo circuit reads, via the shared RAM 101, a position command (or velocity command) from the numerical control device 100, and performs a position loop process, a velocity loop process, and a current loop process.

A position feedback value detected by the encoder 105m, 105s is subtracted from the position command to obtain a position deviation, which is then subjected to position loop control by being multiplied by a position gain to obtain a velocity command, and a velocity feedback value is subtracted from the velocity command to obtain a velocity deviation, followed by the velocity loop process such as proportional control, integral control, etc. to obtain a torque command (current command). Further, the current loop process is performed by subtracting a current feedback value from the torque command, to obtain a voltage command of individual phases, which is then subjected to PWM control etc. to control the operation of the servomotor 104m, 104s.

Figure 2:
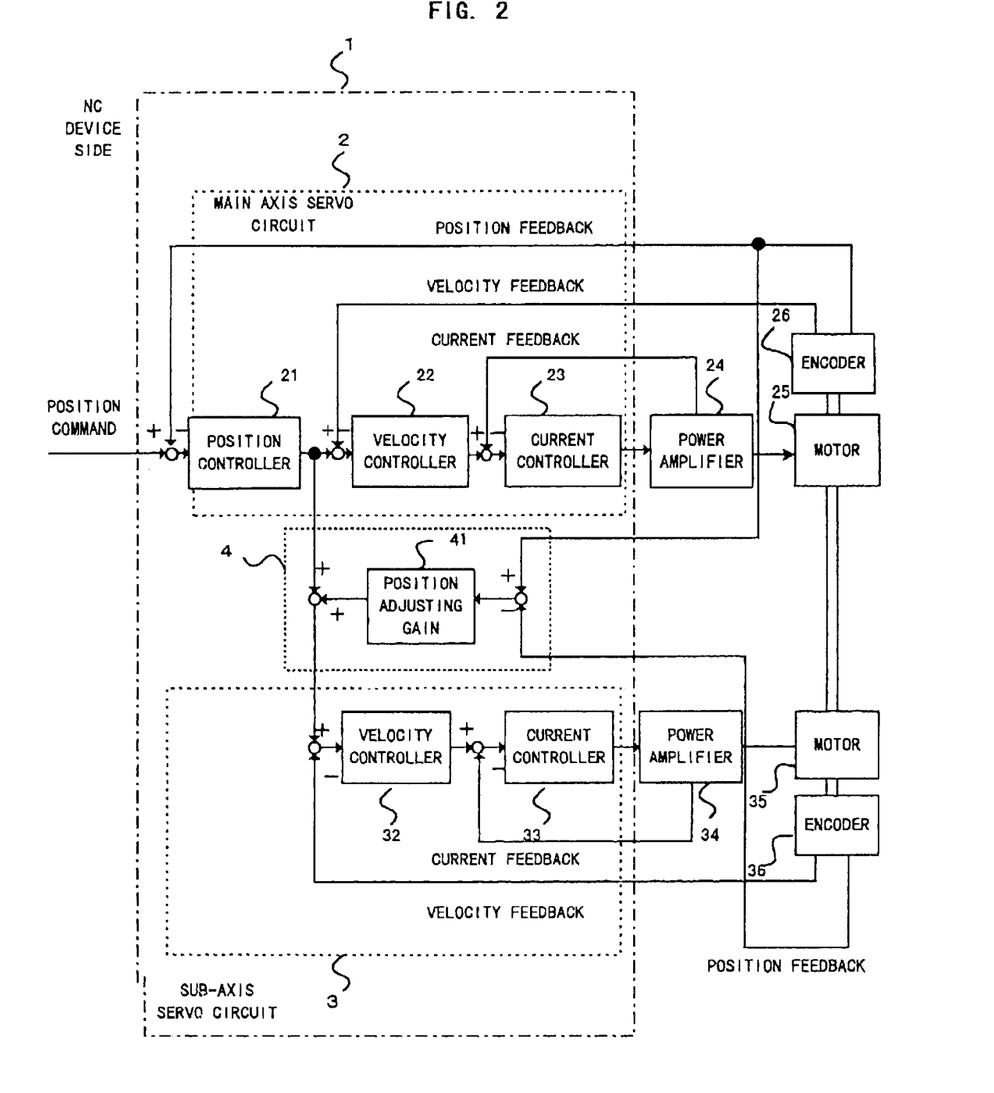
FIG. 2 is a block diagram illustrating a first embodiment of the present invention.
Figure 3:
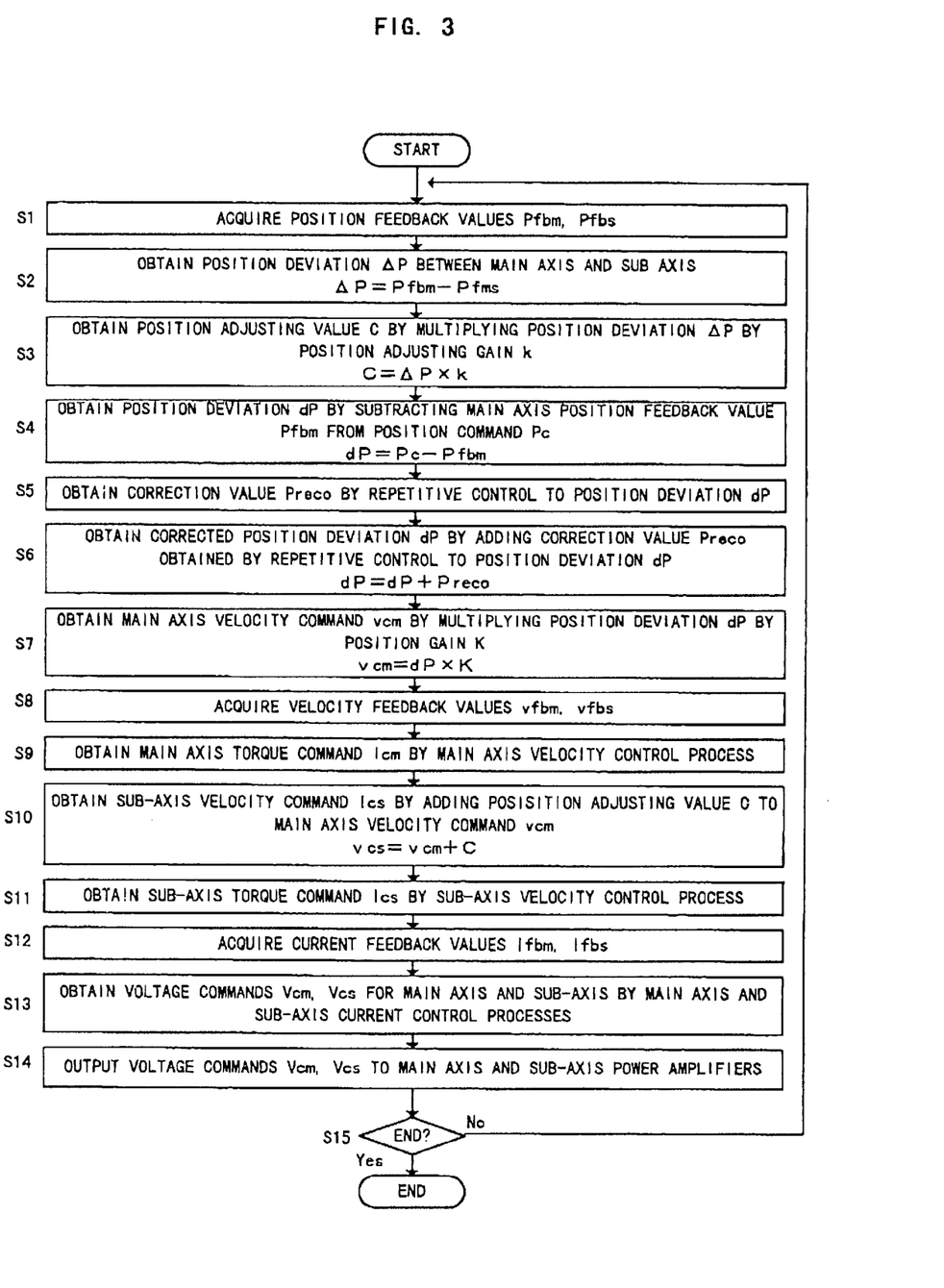
FIG. 3 is a flowchart illustrating the first embodiment of the present invention.

A first embodiment of the present invention will be described first. FIGS. 2 and 3 are a block diagram and a flowchart, respectively, illustrating the first embodiment of the present invention. FIG. 2 shows an arrangement applied to the case where a workpiece, not shown, is driven by two servomotors coupled thereto, and in the following description, a main servomotor and a sub-servomotor correspond, respectively, to the main and subordinate servomotors of the present invention.

In FIG. 2, a main servomotor 25 and a sub-servomotor 35 are coupled to a common workpiece, not shown, and constitute, together with a servo circuit 1, a driving system for driving the workpiece. The servo circuit 1 comprises a main-axis servo circuit 2 for controlling a main axis side including the main servomotor 25, a sub-axis servo circuit 3 for controlling a sub-axis side including the sub-servomotor 35, and a position adjuster 4 provided between the main- and sub-axis servo circuits 2 and 3 to supply a velocity command to the sub-axis servo circuit 3.

The main-axis servo circuit 2 comprises a position controller 21, a velocity controller 22 and a current controller 23, like an ordinary servo circuit, wherein the position controller 21 receives a position command and from the numerical control device (CNC) side and sends a velocity command to the velocity controller 22, the velocity controller 22 receives the velocity command and sends a torque command (current command) to the current controller 23, and the current controller 23 receives the torque command and sends a voltage command to a power amplifier 24. Based on the voltage command, the power amplifier 24 drives the main servomotor 25. A main encoder 26 detects the velocity and position of the main servomotor 25 and feeds a velocity feedback value and a position feedback value back to the main-axis servo circuit 2. A current feedback value is fed back from the power amplifier 24 to the main-axis servo circuit 2.

On the other hand, the sub-axis servo circuit 3 comprises a velocity controller 32 and a current controller 33 but has no position controller, unlike an ordinary servo circuit, wherein the velocity controller 32 receives a velocity command from the position adjuster 4 and sends a torque command (current command) to the current controller 33, and the current controller 33 receives the torque command and sends a voltage command to a power amplifier 34. The power amplifier 34 drives the sub-servomotor 35 in accordance with the voltage command. A sub-encoder 36 detects the velocity and position of the sub-servomotor 35 and feeds a velocity feedback value and a position feedback value back to the sub-axis servo circuit 3.

The position adjuster 4, which is supplied with the position feedback values of the main and sub-servomotors, obtains a difference between these feedback values, multiplies the difference by a position adjusting gain, and using the value thus obtained, adjusts the velocity command input thereto from the position controller 21 of the main-axis servo circuit 2, the adjusted velocity command being supplied to the sub-axis servo circuit 3. Accordingly, the position adjuster 4 has a function of compensating for a position error between the main and sub-servomotors and synchronizing these two servomotors. Also, the position adjuster 4 functions as a position controller for the sub-axis servo circuit 3 and supplies the velocity controller 32 with a velocity command which has been adjusted to achieve synchroneity of the main and sub-servomotors.

FIG. 3 is a flowchart illustrating the operation of the servo circuit shown in FIG. 2. The flowchart of FIG. 3 explains both the first and second embodiments of the present invention, and Steps S5 and S6 are a repetitive control process executed in the second embodiment. Therefore, in the following description of the first embodiment of the invention, Steps S5 and S6 in FIG. 3 are skipped.

The position adjuster 4 acquires a position feedback value Pfbm of the main axis side from the main encoder 26 as well as a position feedback value Pfbs of the sub-axis side from the sub-encoder 36 (Step S1). Then, the position adjuster 4 obtains a position deviation ΔP (=Pfbm−Pfbs) between the position feedback values Pfbm and Pfbs thus acquired. The position deviation ΔP indicates a position deviation between the main axis and the sub-axis (Step S2). The position adjuster 4 further obtains a position adjusting value C (=ΔP×k) by multiplying the position deviation ΔP by a position adjusting gain k (Step S3).

On the other hand, the main-axis servo circuit 2 acquires a position command Pc from the numerical control device side as well as the position feedback value Pfbm of the main axis side from the main encoder 26, and subtracts the position feedback value Pfbm from the position command Pc to obtain a position deviation dP (=Pc−Pfbm) (Step S4). Then, the main-axis servo circuit 2 obtains, in the position controller 21, a main-axis velocity command vcm (=dP×K) by multiplying the position deviation dP by a position gain K (Step S7). Further, the main-axis servo circuit 2 acquires a velocity feedback value vfbm from the main encoder 26 (Step S8), and subjects a deviation between the velocity command vcm and the velocity feedback value vfbm to a velocity control process in the velocity controller 22, to obtain a main-axis torque command (current command) Icm (Step S9).

The position adjuster 4 adds the position adjusting value C obtained in Step S3 to the velocity command vcm obtained by the main-axis servo circuit 2 in Step S7, to adjust the velocity command vcm, and sets the obtained value as a sub-axis velocity command vcs (=vcm+C) (Step S10).

The sub-axis servo circuit 3 acquires the velocity command vcs from the position adjuster 4, obtains a deviation (=vcs−vfbs) between this value and the velocity feedback value vfbs acquired from the sub-encoder 36 in Step S8, and performs a velocity control process in the velocity controller 32, to obtain a sub-axis torque command (current command) Ics (Step S11).

The main- and sub-axis servo circuits 2 and 3 acquire current feedback values Ifbm and Ifbs from the power amplifiers 24 and 34, respectively (Step S12), and perform main- and sub-axis current control processes in the respective current controllers 23 and 33, to obtain main- and sub-axis voltage commands Vcm and Vcs, respectively (Step S13).

The current controller 23 of the main-axis servo circuit 2 supplies the voltage command Vcm to the power amplifier 24 to drive the main servomotor 25, and the current controller 33 of the sub-axis servo circuit 3 supplies the voltage command Vcs to the power amplifier 34 to drive the sub-servomotor 35 (Step S14).

The aforementioned Steps S1 to S13 are repeatedly executed at predetermined intervals (Step S 15).

The process described above permits position deviation of the main and sub-servomotors to be adjusted at high speed on the servo circuit 1 side by means of the position adjuster 4.

Figure 4A:
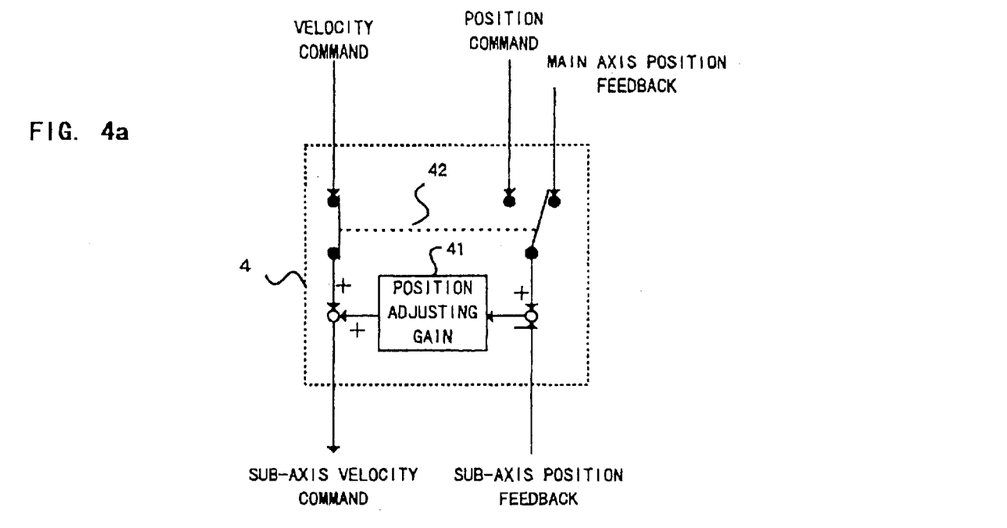
FIGS. 4a–4c are block diagrams illustrating a second embodiment of the present invention.
Figure 4B:
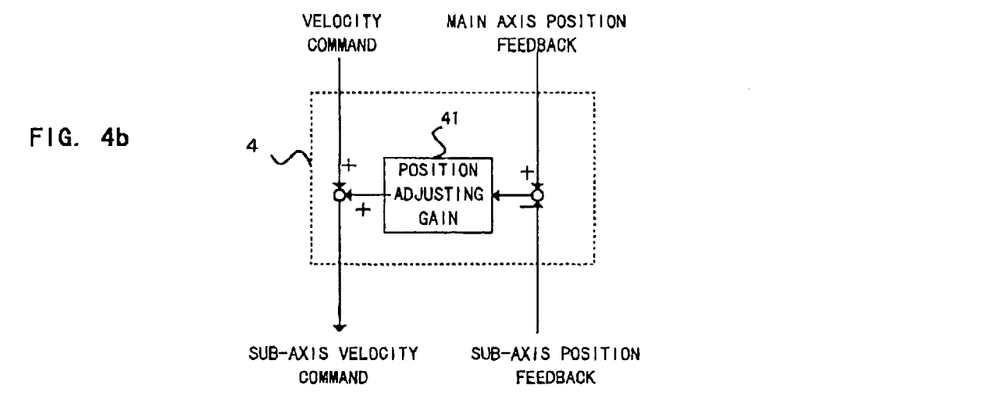
Figure 4C:
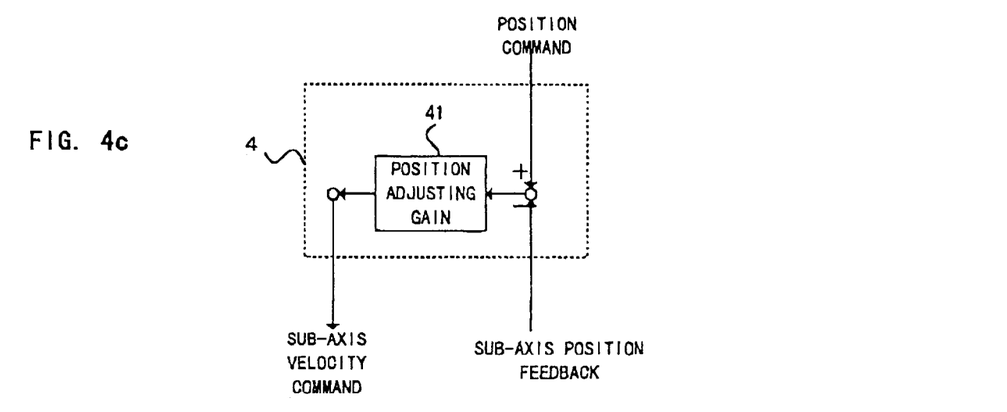

A second embodiment of the present invention will be now described. FIG. 4 shows block diagrams illustrating the second embodiment of the invention.

According to the second embodiment of the present invention, operation mode of the main and sub-servomotors can be switched between coupled drive mode and independent drive mode. In the second embodiment, the drive mode switching is achieved by a switching function incorporated in the position adjuster 4.

FIG. 4 shows an example of having the of the position adjuster 4 having the switching function incorporated therein. In FIG. 4a, the position adjuster 4 includes a term 41 of position adjusting gain, and switching means 42 for selectively applying an input to the term 41. The switching means 42 performs a first operation of switching the input to the position adjusting gain term 41 between the position command from the numerical control device and the main-axis position feedback value and a second operation of switching on or off the input of the velocity command from the main-axis servo circuit 2 to the output side of the position adjusting gain term 41 in such a manner that the first and second operations are synchronized. These switching operations permit the operation mode of the main and sub-servomotors to be switched between the coupled drive mode and the independent drive mode.

Where the main servomotor and the sub-servomotor are to be driven in the coupled drive mode, control operation is performed such that the sub-axis servo circuit is dependent on the main-axis servo circuit. In this control operation, the switching means 42 is switched such that, in FIG. 4a, the velocity command is connected to the output side of the position adjusting gain term 41 while the main-axis position feedback value is connected to the input side of the position adjusting gain term 41. This state of connection is shown in FIG. 4b.

Because of the connection thus established, the main-axis servo circuit outputs, through the position control thereof, one velocity command common to all servo circuits associated with the main and sub-axes, and all servo circuits individually perform the velocity control and the current control for the respective servomotors independently by using the common velocity command. In the velocity control and the current control, the sub-axis servo circuit obtains, in the position adjuster, a position adjusting value by multiplying a difference between the position feedback value thereof and the position feedback value of the main-axis servo circuit by the gain, and performs position adjustment to adjust the velocity command by using the thus-obtained position adjusting value. The sub-axis servo circuit uses, as the sub-axis velocity command input, the velocity command which has been subjected to the position adjustment, and performs the velocity control and the current control independently. In this position adjustment, the gain of the position adjusting gain term 41 is made equal to that of the position controller, whereby synchroneity of the main axis position and the sub-axis position can be maintained.

In cases where the main servomotor and the sub-servomotor are to be driven in the independent drive mode, the main-axis servo circuit and the sub-axis servo circuit are controlled independently of each other.

In this control operation, the switching means 42 is switched such that, in FIG. 4a, the velocity command is not connected to the position adjuster 4 while the position command from the numerical control device side is connected to the input side of the position adjusting gain term 41. This state of connection is shown in FIG. 4c.

Due to the connection thus established, the main-axis servo circuit outputs a velocity command through the position control thereof and performs the velocity control and the current control by using the velocity command, as in ordinary servo control.

The sub-axis servo circuit obtains, in the position adjuster 4, a sub-axis velocity command by multiplying a difference between the position command and the sub-axis position feedback value input thereto by the position adjusting gain 41, thereby using the position adjuster 4 as a substitute for the position controller. In the velocity control and the current control, the sub-axis servo circuit uses, as the sub-axis velocity command input, the velocity command which has been subjected to the position adjustment, and performs the velocity control and the current control independently. In this position adjustment, the gain of the position adjusting gain term 41 is made equal to that of the position controller, whereby synchroneity of the main axis position and the sub-axis position can be maintained.

The switching operation described above makes it possible to easily carry out switchover between coupled drive mode and independent drive mode of a plurality of servomotors and to control the individual servomotors satisfactorily also in the drive mode to which the servomotor operation is switched. The switching operation of the switching means 42 may be performed in response to an external signal.

Figure 5:
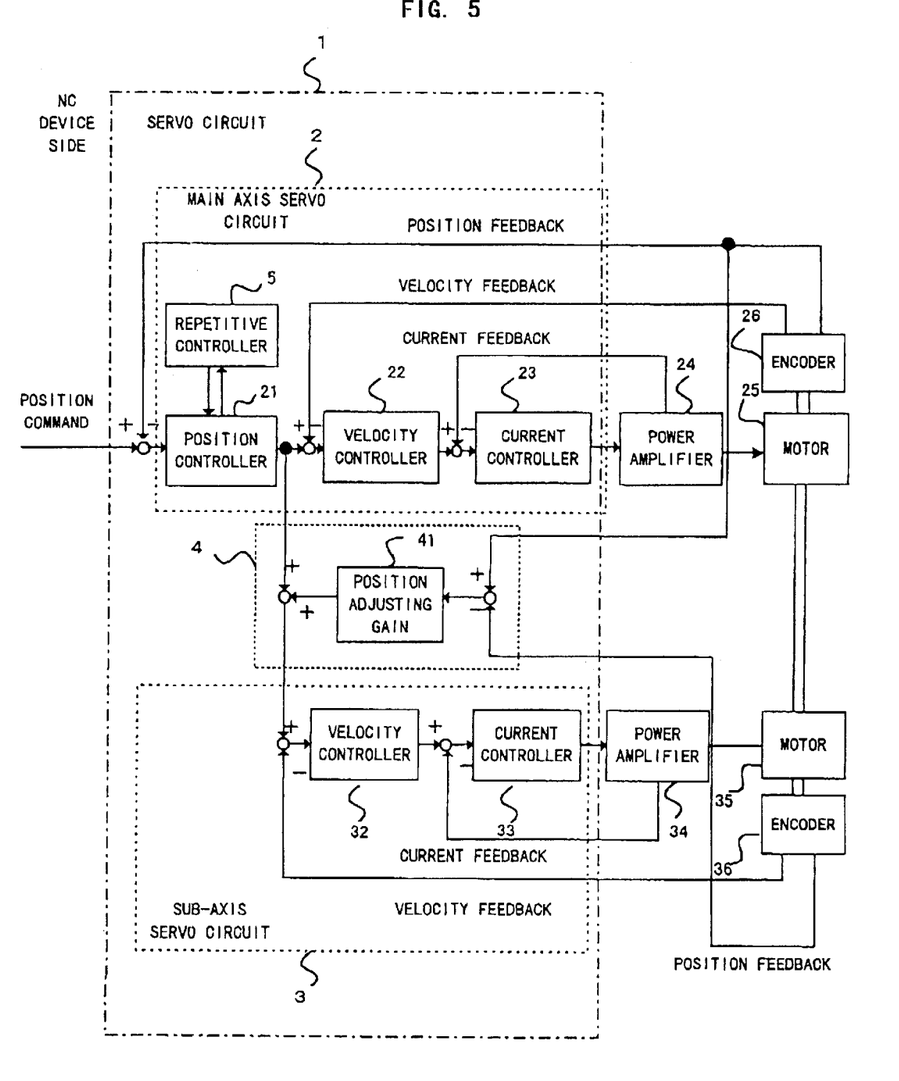
FIG. 5 is a block diagram illustrating a third embodiment of the present invention.
Figure 6:
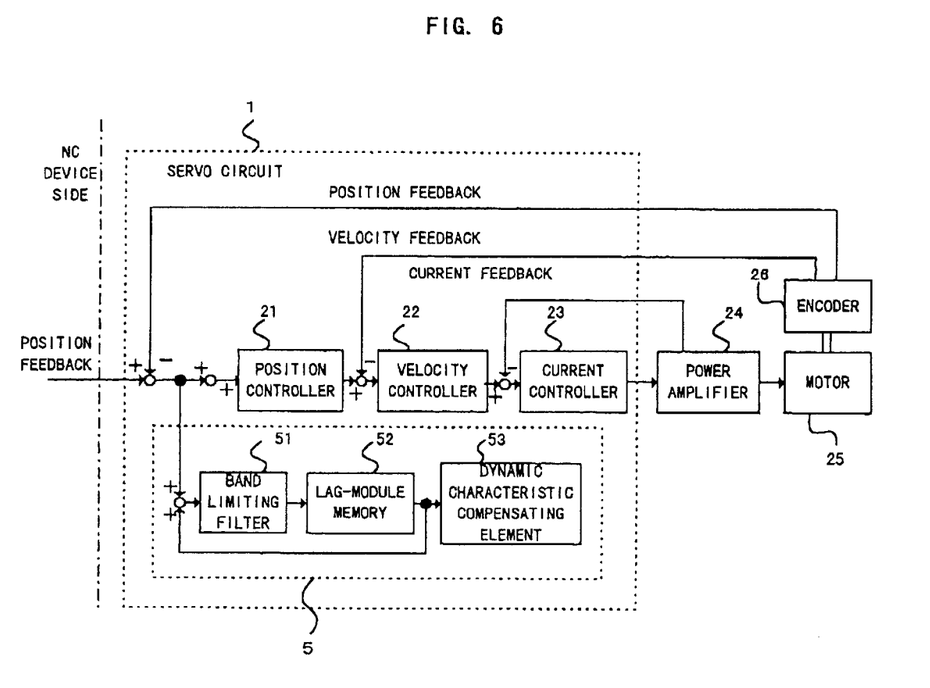
FIG. 6 is a block diagram illustrating the third embodiment of the present invention.

A third embodiment of the present invention will be now described. FIGS. 5 and 6 are block diagrams illustrating the third embodiment of the invention.

In the third embodiment of the present invention, repetitive control is performed with respect only to the position control of the main-axis servo circuit, so that the correction of periodic position deviation which is repeated at a predetermined period is controlled by a single repetitive controller.

In FIG. 5, a repetitive controller 5, which is connected to the position controller 21 of the main-axis servo circuit 2, obtains a periodic position deviation, which is observed during periodic servomotor operation and derived as a difference between the position command and the position feedback value, and performs position control so as to correct the periodic component.

FIG. 6 shows an example of arrangement of the repetitive controller. As shown in FIG. 6, the repetitive controller 5 has a band limiting filter 51, a lag-module memory 52 and a dynamic characteristic compensating element 53 connected in series, wherein the band limiting filter 51 is supplied with the position deviation between the position command from the numerical control device and the position feedback value from the main encoder 26, as well as with the output of the lag-module memory 52, and the output of the dynamic characteristic compensating element 53 is added, as a correction value, to the position deviation.

The band limiting filter 51 serves to stabilize the control system. The lag-module memory 52 is a term for storing data corresponding to one period recurring at a predetermined period, and the dynamic characteristic compensating element 53 is a term for compensating for phase lag and reduction in gain of the controlled system. Provided the predetermined period is L and the sampling period is T, the total memory capacity required of the lag-module memory 52 corresponds to L/T.

The operation of the third embodiment may be basically similar to that shown in the flowchart of FIG. 3 described above. Specifically, between Steps S4 and S7 in the flowchart of FIG. 3, Step S5 is executed to obtain a correction value Preco by the repetitive control, and Step S6 is executed to add the correction value Preco obtained by the repetitive control to the position deviation dP to obtain a corrected position deviation dP, followed by control operation identical to that shown in the flowchart.

According to the third embodiment, the repetitive controller is shared by the main- and sub-axis servo circuits 2 and 3 so that the number of hardware elements and the mounting area can be reduced. Also, like the first and second embodiments, by making the position adjusting gain of the position adjuster matched with the gain of the position control, synchroneity of the main axis position and the sub-axis position can be maintained.

Figure 7:
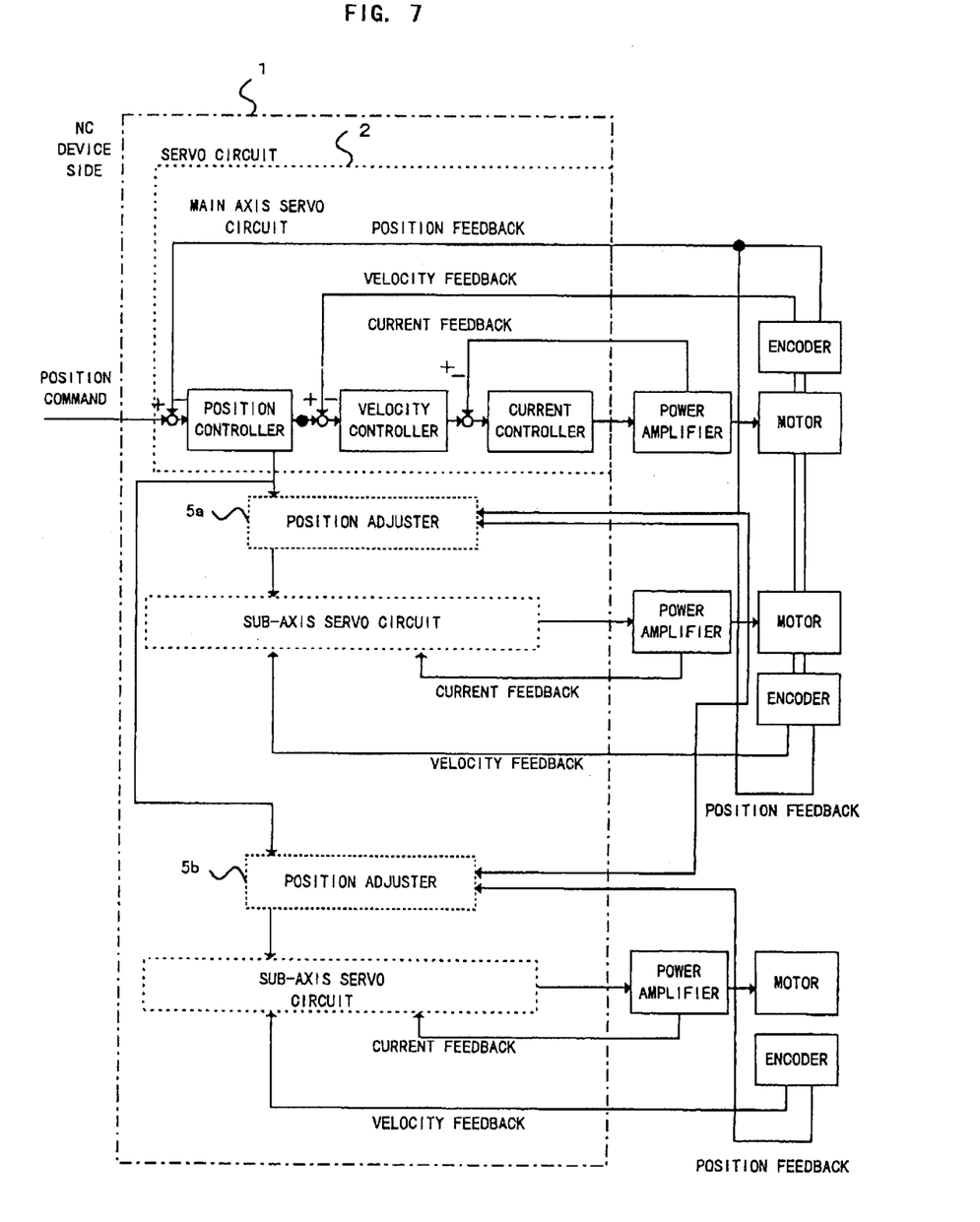
FIG. 7 is a diagram showing an example of arrangement wherein the present invention is applied to a plurality of sub-axis servo circuits.

Although one sub-axis servo circuit 3 is mentioned in the foregoing description, a plurality of sub-axis servo circuits may be provided with respect to the main-axis servo circuit 2. FIG. 7 shows an example of arrangement wherein a plurality of sub-axis servo circuits are provided. In this arrangement, a plurality of sub-axis servo circuits 3 are arranged in parallel with the main-axis servo circuit 2, the position controller of each sub-axis servo circuit 3 is supplied with the velocity command and the position feedback value from the main-axis servo circuit 2, and the sub-axis servomotors are driven by the respective sub-axis servo circuits 3.

Figure 8:
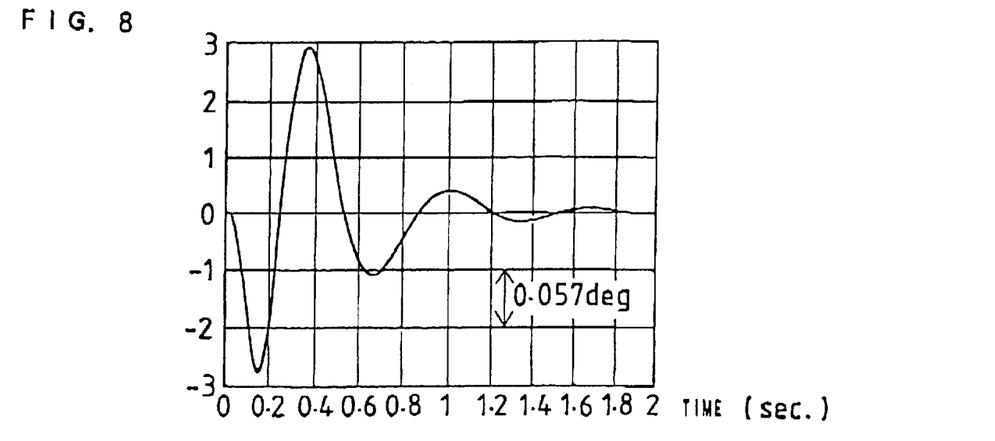
FIG. 8 is a result of simulation obtained with an arrangement wherein a main axis and a sub-axis are each provided with a position controller and a repetitive controller.
Figure 9:
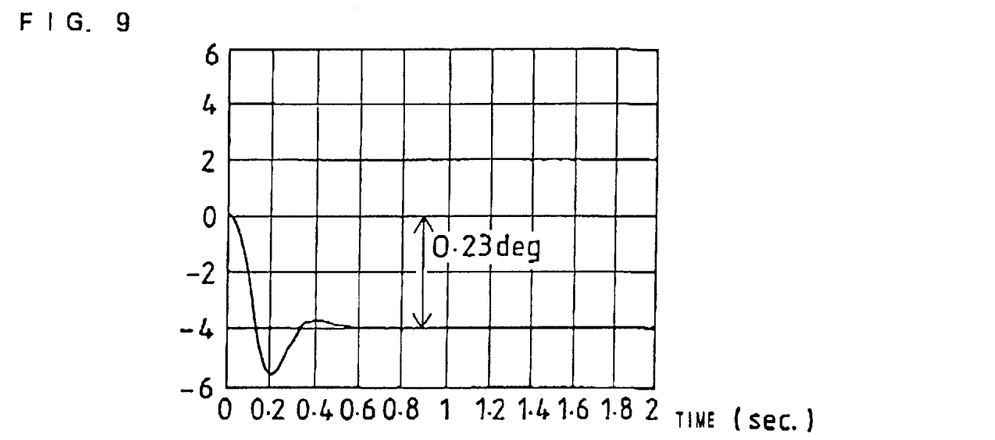
FIG. 9 is a result of simulation obtained with an arrangement wherein a single position controller and a repetitive controller are provided.

FIG. 8 shows a result of simulation obtained with an arrangement wherein the main axis and the sub-axis are each provided with a position controller and a repetitive controller, and in the figure is shown time-based change of the amount of position deviation between the main axis and the sub-axis. With this arrangement, the position deviation converges but a large twist occurs between the main axis and the sub-axis before the convergence. FIG. 9 shows a result of simulation obtained with an arrangement wherein a single position controller and a repetitive controller are provided. With this arrangement, although the position deviation converges, a position deviation occurs between the main axis and the sub-axis.

Figure 10:
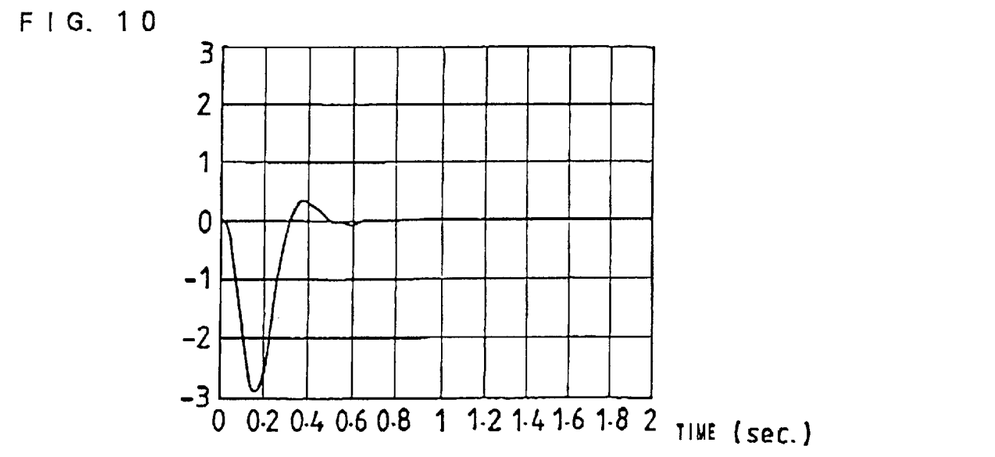
FIG. 10 is a result of simulation obtained in the case where the present invention was applied.

FIG. 10 shows a result of simulation obtained in the case where the present invention was applied As seen from the figure, the rate of deviation convergence according to the repetitive control is improved, compared with the simulation result shown in FIG. 8, and also the position deviation is lessened, compared with the simulation result shown in FIG. 9.

As described above, according to the present invention, synchronous control can be performed with good response and high accuracy. Further, repetitive control can be performed with simple arrangement while preventing interference between axes, and also operation mode of a plurality of servomotors can be easily switched between coupled drive mode and independent drive mode.

What is claimed is:

1. A method of controlling a main servomotor and at least one sub-servomotor to cooperatively drive one driven body by synchronizing said main servomotor and said sub-servomotor with each other, comprising the steps of:
    (a) performing position control processing for said main servomotor to output a common velocity command for said main servomotor and for said sub-servomotor;
    (b) performing velocity control processing for said main servomotor based on said common velocity command;
    (c) obtaining a position adjusting value for said sub-servomotor by multiplying a difference between a position feedback value of said main servomotor and a position feedback value of said sub-servomotor by a gain having the same value as that of a position gain used in the position control processing for said main servomotor, and adjusting said common velocity command using said position adjusting value;
    (d) performing velocity control processing for said sub-servomotor based on the adjusted velocity command.

2. A method of controlling a main servomotor and at least one sub-servomotor according to claim 1, said step (a) including the steps of correcting a periodic element in a deviation between a position command and the position feedback value of said main servomotor, and performing the position control processing using the corrected position deviation.

3. A method of controlling a main servomotor and at least one sub-servomotor to cooperatively drive one driven body, comprising the steps of:
    (a) switching into one of a synchronized operation mode in which said main servomotor and said sub-servomotor operate in synchronism with each other and an independent operation mode in which said main servomotor and said sub-servomotor operate independently of each other;
    (b) performing position control processing for said main servomotor to output a velocity command;
    (c) performing velocity control processing for said main servomotor based on said velocity command;
    (d) in the synchronized operation mode, obtaining a position adjusting value for said sub-servomotor by multiplying a difference between a position feedback value of said main servomotor and a position feedback value of said sub-servomotor by a gain having the same value as that of a position gain used in the position control processing for said main servomotor, and adjusting said velocity command using said position adjusting value, and in the independent operation mode, obtaining a velocity command for said sub-servomotor by multiplying a difference between a position command and the position feedback value of said sub-servomotor by the gain having the same value as that of the position gain used in the position control processing for said main servomotor;
    (e) in the synchronizing operation mode, performing velocity control processing for said sub-servomotor based on the adjusted velocity command, and in the independent operation mode, performing velocity control processing for said sub-servomotor based on the velocity command for said sub-servomotor.

4. A method of controlling a main servomotor and at least one sub-servomotor according to claim 3, said step (b) including the steps of: correcting a periodic element in a deviation between a position command and the position feedback value, and performing the position control processing using the corrected position deviation.

5. An apparatus for controlling a main servomotor and at least one sub-servomotor to cooperatively drive one driven body by synchronizing said main servomotor and said sub-servomotor with each other, comprising:

position control means for performing position control processing for said main servomotor to output a common velocity command for said main servomotor and for said sub-servomotor;

main velocity control means for performing velocity control processing for said main servomotor based on said common velocity command;

position adjusting means for obtaining a position adjusting value for said sub-servomotor by multiplying a difference between a position feedback value of said main servomotor and a position feedback value of said sub-servomotor by a gain having the same value as that of a position gain used in the position control processing for said main servomotor, and adjusting said common velocity command using said position adjusting value;

sub-velocity control means for performing velocity control processing for said sub-servomotor based on the adjusted velocity command.

6. An apparatus for controlling a main servomotor and at least one sub-servomotor according to claim 5, said position control means including periodic element correcting means for correcting a periodic element in a deviation between a position command and the position feedback value of said main servomotor, and performs the position control processing using the corrected position deviation.

7. An apparatus for controlling a main servomotor and at least one sub-servomotor to cooperatively drive one driven body, comprising:

switching means for switching into one of a synchronized operation mode in which said main servomotor and said sub-servomotor operates in synchronism with each other and an independent operation mode in which said main servomotor and said sub-servomotor operates independently of each other;

position control means for performing position control processing for said main servomotor to output a velocity command;

main velocity control means for performing velocity control processing for said main servomotor based on said velocity command;

position adjusting/control means for, in the synchronized operation mode, obtaining a position adjusting value for said sub-servomotor by multiplying a difference between a position feedback value of said main servomotor and a position feedback value of said sub-servomotor by a gain having the same value as that of a position gain used in the position control processing for said main servomotor, and adjusting said velocity command using said position adjusting value, and in the independent operation mode, obtaining a velocity command for said sub-servomotor by multiplying a difference between a position command and the position feedback value of said sub-servomotor by a gain having the same value as that of the position gain used in the position control processing for said main servomotor;

sub-velocity control means for, in the synchronized operation mode, performing velocity control processing for said sub-servomotor based on the adjusted velocity command, and in the independent operation mode, performing velocity control processing for said sub-servomotor based on the velocity command for said sub-servomotor.

8. An apparatus for controlling a main servomotor and at least one sub-servomotor according to claim 7, said position control means including periodic element correcting means for correcting a periodic element in a deviation between a position command and the position feedback value of said main servomotor, and performs the position control processing using the corrected position deviation.

* * * * *